(12) United States Patent
Foltan (10) Patent No.: US 11,443,641 B2
(45) Date of Patent: Sep. 13, 2022

(54) SYSTEMS AND METHODS FOR FLIGHT PLAN MODIFICATIONS

(71) Applicant: HONEYWELL INTERNATIONAL INC., Morris Plains, NJ (US)

(72) Inventor: Stanislav Foltan, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 205 days.

(21) Appl. No.: 16/822,181

(22) Filed: Mar. 18, 2020

(65) Prior Publication Data

US 2021/0295716 A1  Sep. 23, 2021

(51) Int. Cl.
*G08G 5/00* (2006.01)
*G01C 21/20* (2006.01)

(52) U.S. Cl.
CPC .......... *G08G 5/0039* (2013.01); *G01C 21/20* (2013.01); *G08G 5/0013* (2013.01)

(58) Field of Classification Search
CPC ..... G08G 5/0039; G08G 5/0013; G01C 21/20
See application file for complete search history.

(56) References Cited

U.S. PATENT DOCUMENTS

| | | | |
|---|---|---|---|
| 9,177,480 B2 | 11/2015 | Subbu et al. | |
| 9,365,287 B2 | 6/2016 | Garrido-Lopez et al. | |
| 9,495,878 B2 | 11/2016 | Kozlow | |
| 9,734,724 B2 | 8/2017 | Zammit et al. | |
| 9,847,034 B1 | 12/2017 | Plawecki | |
| 10,026,324 B2 | 6/2018 | Shamasundar et al. | |
| 10,304,344 B2 | 5/2019 | Moravek et al. | |
| 2008/0065312 A1 | 3/2008 | Coulmeau et al. | |
| 2013/0080043 A1* | 3/2013 | Ballin | G08G 5/0078 701/120 |
| 2018/0005533 A1 | 1/2018 | Lohmiller et al. | |
| 2018/0061246 A1* | 3/2018 | Adler | G08G 5/025 |

FOREIGN PATENT DOCUMENTS

| | | |
|---|---|---|
| CN | 107992081 A | 5/2018 |
| CN | 109582035 A | 4/2019 |
| EP | 2867880 A1 | 5/2015 |
| EP | 3288007 A1 | 2/2018 |

OTHER PUBLICATIONS

Abozied, Mohammed, et al. "High-Performance Path Planning of UAV Under Complex Environment," International Journal of Modeling and Optimization, vol. 6, No. 5, Oct. 2016.
Altus, Steve, Ph.D., "Effective Flight Plans Can Help Airlines Economize," Aero Qtr. Mar. 9.

* cited by examiner

*Primary Examiner* — Alan D Hutchinson
(74) *Attorney, Agent, or Firm* — Lorenz & Kopf, LLP (57) ABSTRACT

Methods and systems for modifying a flight plan to implement micro-shortcuts. The system identifies a segment of interest within an initial flight plan, the segment of interest being a section to consider for a micro-shortcut. The system determined a geographical environment associated with the segment of interest and determines a relevant air traffic control (ATC) for the geographical environment. The system requests, from the relevant ATC, an amount of deviation from the initial flight plan for the segment of interest. Upon obtaining permission for the amount of deviation from the initial flight plan for the segment of interest, the system calculates a shortest path (i.e., a micro-shortcut) for the segment of interest. The system modifies the initial flight plan and commands the FMS to fly the shortest path for the segment of interest.

20 Claims, 3 Drawing Sheets

SYSTEMS AND METHODS FOR FLIGHT PLAN MODIFICATIONS

TECHNICAL FIELD

The present invention generally relates to aircraft systems that support flight plan modifications, and more particularly relates to aircraft systems and methods for modifying a flight plan to implement a micro-shortcut.

BACKGROUND

There is a direct relationship between the distance traveled along a flight plan and the fuel consumed for the flight. Therefore, if any shortcuts can be implemented along the flight plan, fuel may be conserved.

However, there can be many technical problems with respect to implementing shortcuts. First, there may be a corridor that the aircraft must stay within. In some examples, the corridor the aircraft must stay within is a RNAV 5 (area navigation five nautical miles on either side of the flight plan) corridor; it can also be a RNAV 10 (area navigation ten nautical miles on either side of the flight plan) corridor, a +/−3 mile corridor, a +/−4 mile corridor, and etc. Additionally, in many populous areas, the respective air traffic control (ATC) authority may determine that the traffic is too dense to accommodate a deviation from the flight plan.

Accordingly, improved aircraft systems and methods that provide technical solutions for modifying flight plans to implement micro-shortcuts, defined as shortcuts that do not exceed RNAV 5 boundaries, are desirable. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe selected concepts in a simplified form that are further described in the Detailed Description. This summary is not intended to identify key or essential features of the claimed subject matter, nor is it intended to be used as an aid in determining the scope of the claimed subject matter.

Provided is a method for flight plan modification in an aircraft. The method includes: determining, by a processing system comprising a processor and a memory device, that the aircraft is operating on a flight plan; identifying a segment of interest within the flight plan; determining a geographical environment associated with the segment of interest; determining, by the processing system, a relevant air traffic control (ATC) for the geographical environment; requesting, from the relevant ATC, an amount of deviation from the flight plan for the segment of interest; obtaining, from the relevant ATC, permission for the amount of deviation from the flight plan for the segment of interest; using at least the amount of deviation to calculate a shortest path for the segment of interest, wherein the shortest path is an air distance; and modifying the flight plan for the segment of interest such that the aircraft flies the shortest path for the segment of interest.

A system for flight plan modification on-board an aircraft is provided. The system includes: a navigation system; and a processing system coupled to the navigation system and programmed to determine that the aircraft is operating on an initial flight plan; identify a segment of interest within the initial flight plan; determine a geographical environment associated with the segment of interest; determine a relevant air traffic control (ATC) for the geographical environment; request, from the relevant ATC, an amount of deviation from the initial flight plan for the segment of interest; obtain, from the relevant ATC, permission for the amount of deviation from the initial flight plan for the segment of interest; use at least the amount of deviation to calculate a shortest path for the segment of interest, wherein the shortest path is an air distance; and modify the initial flight plan for the segment of interest such that the aircraft flies the shortest path for the segment of interest.

Also provided is an aircraft system on-board an aircraft. The aircraft system includes: a navigation system; a flight management system (FMS); and a processing system coupled to the navigation system and FMS, the processing system configured to: determine that the aircraft is operating on an initial flight plan; identify a segment of interest within the initial flight plan; determine a geographical environment associated with the segment of interest; determine a relevant air traffic control (ATC) for the geographical environment; request, from the relevant ATC, an amount of deviation from the initial flight plan for the segment of interest; obtain, from the relevant ATC, permission for the amount of deviation from the initial flight plan for the segment of interest; use at least the amount of deviation to calculate a shortest path for the segment of interest; and modify the initial flight plan for the segment of interest; and command the FMS to fly the shortest path for the segment of interest.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
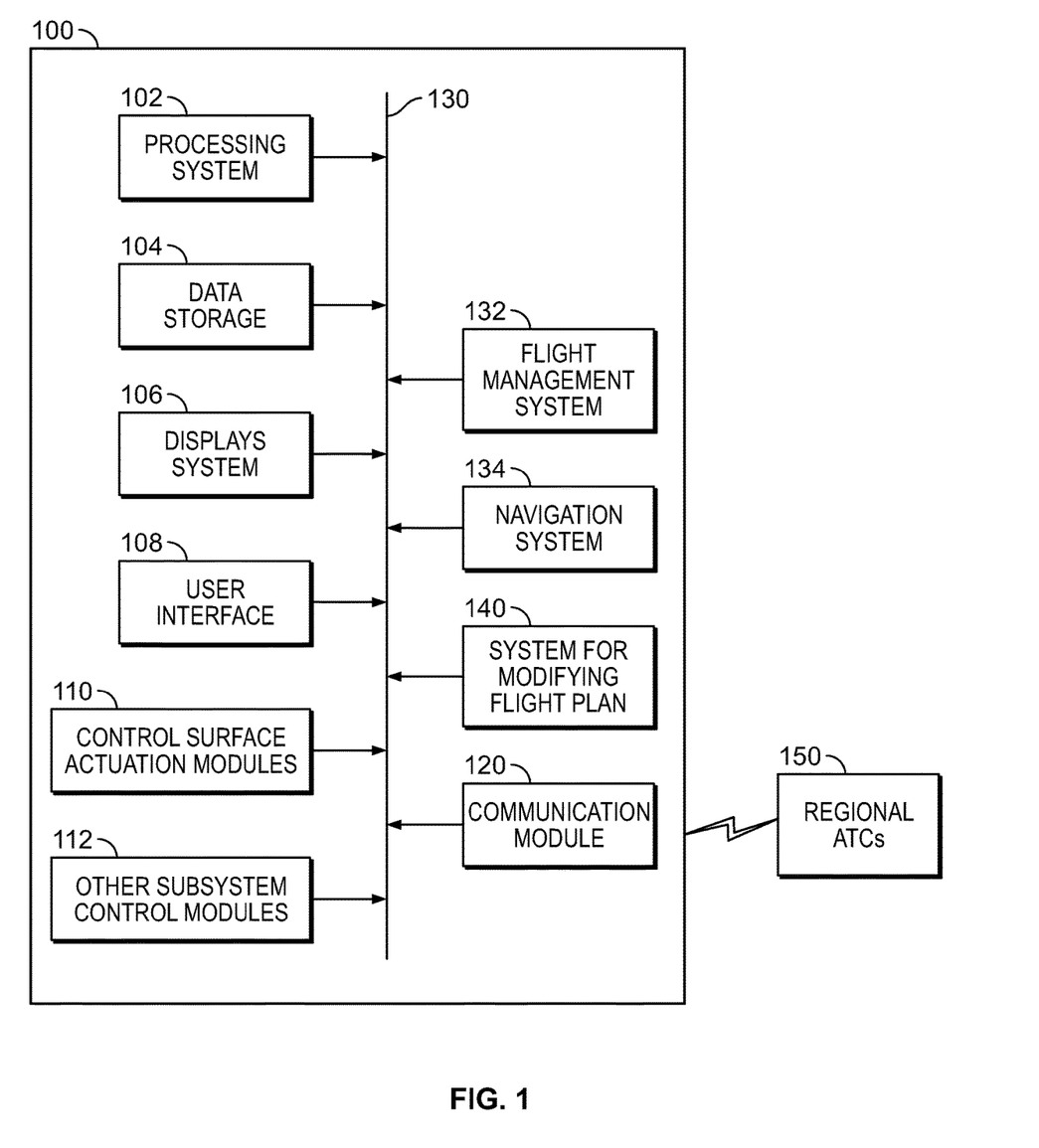
FIG. 1 is a schematic block diagram of an aircraft system including a system for flight plan modification, in accordance with various embodiments.

FIG. 1 is a schematic block diagram of an aircraft system 100 with a system for flight plan modification 140, in accordance with an exemplary embodiment. The illustrated embodiment of the aircraft system 100 includes, without limitation: at least one processing system 102; an appropriate amount of data storage 104; a displays system 106; a user interface 108; control surface actuation modules 110; other subsystem control modules 112; a flight management system (FMS) 132, a navigation system 134, a system for flight plan modification 140 and a communication module 120. These elements of the aircraft system 100 may be coupled together by a suitable interconnection architecture 130 that accommodates data communication, the transmission of control or command signals, and/or the delivery of operating power within the aircraft system 100. It should be understood that FIG. 1 is a simplified representation of the aircraft system 100 that will be used for purposes of explanation and ease of description, and that FIG. 1 is not intended to limit the application or scope of the subject matter in any way. In practice, the aircraft system 100 and the host aircraft will include other devices and components for providing additional functions and features, as will be appreciated in the art. Furthermore, although FIG. 1 depicts the aircraft system 100 as a single unit, the individual elements and components of the aircraft system 100 could be implemented in a distributed manner using any number of physically distinct pieces of hardware or equipment.

The processing system 102 may be implemented or realized with one or more general purpose processors, content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration).

As described in more detail below, the processing system 102 may implement a flight plan modification algorithm and, when operating in that context, may be considered the system for flight plan modification 140. In various embodiments, the system for flight plan modification 140 is integrated within an enhanced flight management system (FMS), and hence the flight plan modification algorithm is executed within the enhanced FMS. In accordance with various embodiments, processing system 102 is configured to execute the flight plan modification algorithm so as to break an initial flight plan into segments, identify a segment of interest with the initial flight plan, determine, for the identified segment of interest, an associated geographical environment, and then determine a relevant air traffic control (ATC) for the geographical environment. In addition, the processing system 102 may generate commands, which may be communicated through interconnection architecture 130 to various other system 100 components. Such commands may cause the various system components to alter their operations, provide information to the processing system 102, or perform other actions, non-limiting examples of which will be provided below.

The data storage 104 may be realized as RAM memory, flash memory, EPROM memory, EEPROM memory, registers, a hard disk, a removable disk, a CD-ROM, or any other form of storage medium known in the art. In this regard, the data storage 104 can be coupled to the processing system 102 such that the processing system 102 can read information from, and write information to, the data storage 104. In the alternative, the data storage 104 may be integral to the processing system 102. As an example, the processing system 102 and the data storage 104 may reside in an ASIC.

In practice, a functional or logical module/component of the aircraft system 100 might be realized as an algorithm embodied in program code that is maintained in the data storage 104. For example, the processing system 102, the displays system 106, the control modules 110, 112, and/or the communication module 120 may have associated software program components that are stored in the data storage 104. Accordingly, as used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Generally, modules of aircraft system 100 are stored in data storage 104 and executed by processing system 102.

The displays system 106 includes one or more lateral displays, vertical displays, and multi-function displays and associated graphics processors. Processing system 102 and displays system 106 cooperate to display, render, or otherwise convey one or more graphical representations, synthetic displays, graphical icons, visual symbology, or images associated with operation of the host aircraft. An embodiment of the aircraft system 100 may utilize existing graphics processing techniques and technologies in conjunction with the displays system 106. For example, displays system 106 may be suitably configured to support well known graphics technologies such as, without limitation, VGA, SVGA, UVGA, or the like.

User interface 108 is suitably configured to receive input from a user (e.g., a pilot) and, in response to the user input, to supply appropriate command signals to the processing system 102. The user interface 108 may include any one, or any combination, of various known user interface devices or technologies, including, but not limited to: a cursor control device such as a mouse, a trackball, or joystick; a keyboard; buttons; switches; knobs; levers; or dials. Moreover, the user interface 108 may cooperate with the displays system 106 to provide a graphical user interface. Thus, a user can manipulate the user interface 108 by moving a cursor symbol rendered on a display, and the user may use a keyboard to, among other things, input textual data. For example, the user could manipulate the user interface 108 to initiate or influence execution of the speech recognition application by the processing system 102, and the like.

In an exemplary embodiment, the communication module 120 is suitably configured to support data communication between the host aircraft and one or more remote systems 150. For example, the communication module 120 may be designed and configured to enable the host aircraft to communicate with a plurality of regional air traffic control (ATC) authorities 150, automatic terminal information service (ATIS), other ground and air communications, etc. In this regard, the communication module 120 may include or support a datalink subsystem that can be used to provide ATC data to the host aircraft and/or to send information from the host aircraft to a regional ATC system 150, preferably in compliance with known standards and specifications. In certain implementations, the communication module 120 is also used to communicate with other aircraft that are near the host aircraft and optionally also with ground vehicles. For example, the communication module 120 may be configured for compatibility with Automatic Dependent Surveillance-Broadcast (ADS-B) technology, with Traffic and Collision Avoidance System (TCAS) technology, and/or with similar technologies.

Flight management system 132 (FMS) (or, alternatively, a flight management computer) is located onboard an aircraft and is included in aircraft system 100. Flight management system 132 is coupled to displays system 106 and may include one or more additional modules or components as necessary to support navigation, flight planning, and other aircraft control functions in a conventional manner. In addition, the flight management system 132 may include or otherwise access a terrain database, navigational database (that includes airport diagrams, STAR, SID, and en route procedures, for example), geopolitical database, taxi database, or other information for rendering a navigational map or other content on displays system 100, as described below. The FMS 132 is capable of tracking a flight plan and also allowing a pilot and/or autopilot system (not shown) to make changes to the flight plan, as described below.

The navigation system 134 is configured to obtain one or more navigational parameters associated with operation of an aircraft. The navigation system 134 may include a global positioning system (GPS), inertial reference system (IRS) and/or a radio-based navigation system (e.g., VHF omni-directional radio range (VOR) or long range aid to navigation (LORAN)), and may include one or more navigational radios or other sensors suitably configured to support operation of the navigation system, as will be appreciated in the art. In an exemplary embodiment, the navigation system 134 is capable of obtaining and/or determining navigation data, including but not limited to: the current location of the aircraft (e.g., with reference to a standardized geographical coordinate system); the heading of the aircraft (i.e., the direction the aircraft is traveling in relative to some reference); the ground speed; and, the orientation (roll, pitch, yaw) of the aircraft. The navigation system 134 provides the navigation data to the interconnection architecture 130, from which other system 100 components, such as the processing system 102, may receive and process the navigation data.

Control surface actuation modules 110 include electrical and mechanical systems configured to control the orientation of various flight control surfaces (e.g., ailerons, wing flaps, rudder, and so on). Processing system 102 and control surface actuation modules 110 cooperate to adjust the orientation of the flight control surfaces in order to affect the attitude and flight characteristics of the host aircraft.

Processing system 102 also may cooperate with other subsystem control modules 112 to affect various aspects of aircraft operations. For example, but not by way of limitation, the other subsystem control modules 112 may include, but are not limited to, a landing gear actuation module, a cabin environment control system, a throttle control system, a propulsion system, a radar system, and a data entry system.

Figure 2:
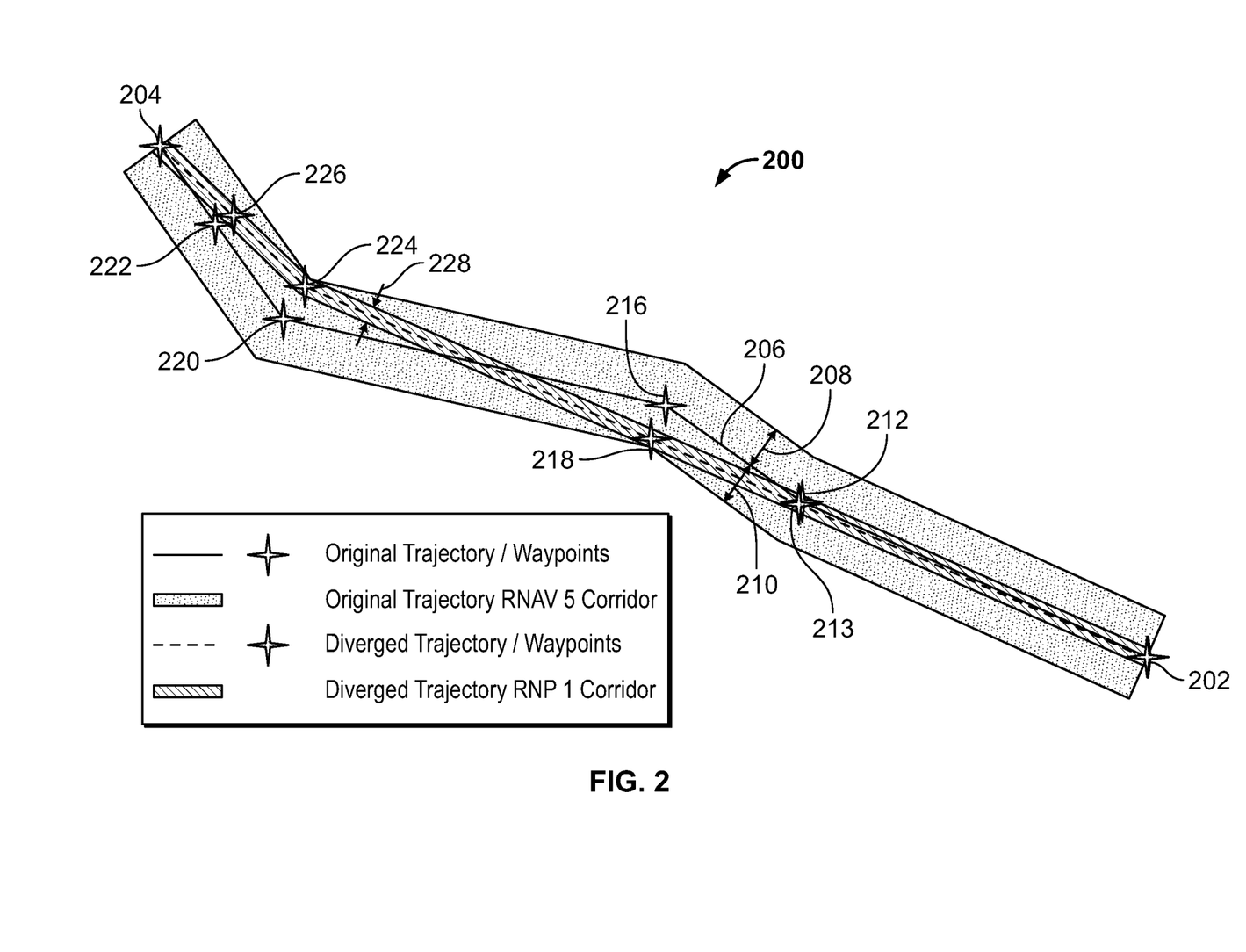
FIG. 2 is a schematic block diagram of a system for flight plan modification, in accordance with various embodiments.
Figure 3:
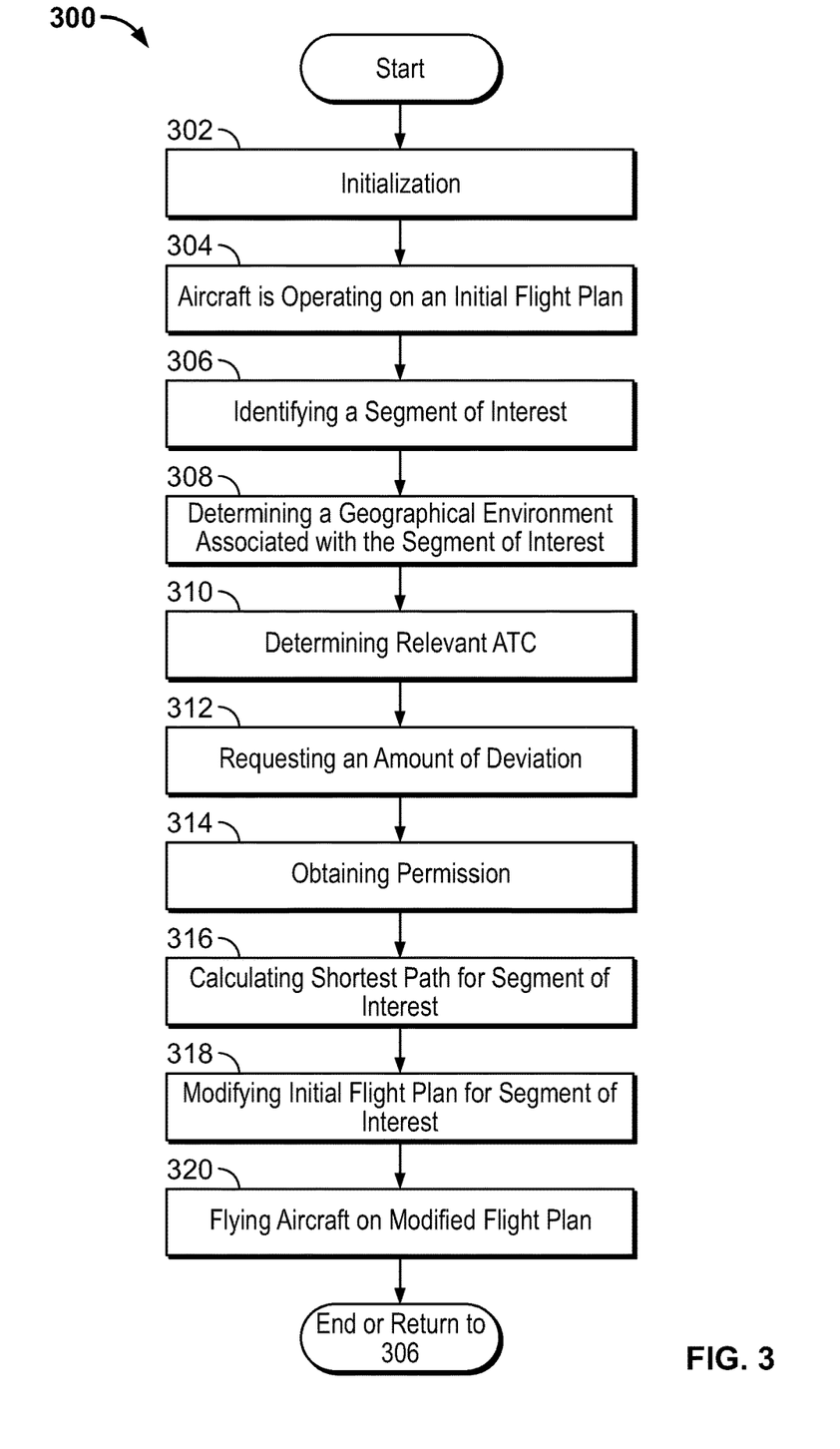
FIG. 3 is a flowchart of a method for flight plan modification in an aircraft system, in accordance with various embodiments.

FIG. 2 is an illustration of an application of an embodiment of the system for flight plan modification. In FIG. 3, with reference to FIGS. 1 and 2, the aircraft system 100 described above may be implemented by a processor-executable method for flight plan modification 300. For illustrative purposes, the following description of method 300 may refer to elements mentioned above in connection with FIG. 1, and objects with reference to FIG. 2. In practice, portions of method 300 may be performed by different components of the described aircraft system 100. It should be appreciated that method 300 may include any number of additional or alternative tasks, the tasks shown in FIG. 3 need not be performed in the illustrated order, and method 300 may be incorporated into a more comprehensive procedure or method, such as within the enhanced FMS, having additional functionality not described in detail herein. Moreover, one or more of the tasks shown in FIG. 3 could be omitted from an embodiment of the method 300 as long as the intended overall functionality remains intact.

The method starts, and at 302 the processing system 102 is initialized. Initialization may comprise uploading or updating into data storage 104, or directly into the processing system 102, instructions and applications and a flight plan modification software program. In operation, the processing system 102 that is located onboard the aircraft and comprises a processor and a memory device, determines that the aircraft is operating on an initial flight plan (304). In FIG. 2, some of an initial flight plan 206 is depicted, as may be displayed on a lateral navigation map. To identify potential micro-shortcuts for the initial flight plan 206, the initial flight plan 206 is viewed as a plurality of sequential segments, and some of the segments may be suitable for a micro-shortcut. A segment of interest that is a portion of the initial flight plan 206 that is believed may be suitable for a micro-shortcut. A segment of interest can be identified in various ways (at 306). In some embodiments, the segment of interest is defined by (i) a starting location and (ii) an ending location that is (iii) a distance from the starting location. In some embodiments, the segment of interest is defined by (i) a starting waypoint and (ii) an ending waypoint. In yet other embodiments, the segment of interest is defined by a current position and an amount of time.

It is to be appreciated that the word "initial," as used herein, distinguishes a first flight plan from a subsequent/second, modified flight plan. In various embodiments, the initial flight plan may be referred to as a preceding flight plan, a former flight plan, or a past flight plan. In other words, the initial flight plan is a first iteration, however, once the initial flight plan is modified (becoming a subsequent/second flight plan), the modified (or subsequent/second) flight plan may become the initial flight plan in a second iteration of calculating and applying a second micro-shortcut in the figures and methods described herein.

In FIG. 2 a segment of interest 200 is defined as being from waypoint 202 to waypoint 204, for which the initial flight plan passes through waypoints 212, 216, 220, and 222. In the example, the initial flight plan 206 is bounded by a corridor that is an RNAV 5 corridor depicted by 208 and 210. As mentioned, in various embodiments, the corridor can be plus/minus other distances. The processing system 102 then determines a geographical environment associated with the segment of interest (at 308).

As used herein, the geographic environment means a regional boundary, such as a country boundary, that has its own unique air traffic control (ATC) authority. As may be appreciated, each time the aircraft enters into a new geographic environment, it will be expected to check in and follow the rules of the regional ATC. As may be appreciated, on a given flight plan, the aircraft may fly in one or more geographic environments. In some embodiments, determining a geographical environment associated with the segment of interest is based on human input. Human input may be received via the user interface 108. The timing of the reception of human input may be prior to the start of the flight, or during flight, such as, contemporaneous with identifying the segment of interest 200. In some embodiments, determining a geographical environment associated with the segment of interest 200 is based on the processing system 102 referencing a predefined map; such a map could be stored in a database included within the data storage 104 component. In yet other embodiments, one of the other subsystem control modules 112 includes a flight assistance tool/application, optionally connected to a ground system, that determines the geographical environment associated with the segment of interest 200.

Once the segment of interest is identified, a relevant air traffic control (ATC) for the geographical environment is determined (at 310). In some embodiments, determining a relevant ATC for the geographical environment is based on human input, received via the user interface 108. In some embodiments, determining a relevant ATC for the geographical environment is performed by the processing system 102 after referencing one or more databases.

At 312, permission is requested, from the relevant ATC, for a predetermined amount of deviation. The predetermined amount of deviation is a lateral plus/minus distance from the initial flight plan for the segment of interest 200. As mentioned, the amount of deviation may be a pre-programmed +/− nautical mile(s) number, and it is understood to be less than the corridor in which the initial flight plan 206 is operating. In some embodiments, at 312, communication with the relevant ATC may be via the communication module 120. In some embodiments, at 312, the processing system 102 prompts the pilot, via the user interface, to verbally communicate with the relevant ATC at 312. In other embodiments, the processing system 102 formats the request and utilizes a datalink or other communication protocol to transmit the request to the relevant ATC at 312.

In various embodiments, when the aircraft has precise navigation capabilities, such as RNP 1, meaning it is precise to plus or minus one nautical mile, so long as the corridor (e.g., shown by 208 and 210) is larger than the precision of the aircraft navigation capabilities, the step of requesting ATC permission (at 312) may not be required.

Regardless of the amount of deviation requested, the processing system waits until it obtains permission (at 314) from the relevant ATC, for the amount of deviation from the initial flight plan 206 for the segment of interest 200. Responsive to obtaining from the relevant ATC, permission for the amount of deviation from the initial flight plan for the segment of interest, the processing system 102 uses at least the amount of deviation to calculate a shortest path (at 316) from the beginning of the segment of interest 200 to the end of the segment of interest 200. What is meant herein by "uses at least the amount of deviation" is that the processing system 102 may also use, in calculating the shortest path, other inputs, such as weather data and terrain data; it does not mean that the shortcut will use a deviation of more than the requested amount. Further, it is to be understood that the shortest distance, as used herein, is an air distance. With reference to FIG. 2, the shortest distance (a micro-shortcut) from waypoint 202 to waypoint 204 is calculated to be a modified route from waypoint 202 to waypoint 213 to waypoint 218, then waypoint 224, and waypoint 226 before aligning back with waypoint 204 at the end of the segment of interest 200.

The processing system 102 automatically modifies the initial flight plan for the segment of interest 200 (at 318) and at 320, may command the FMS 132 to fly the aircraft accordingly; i.e., the processing system 102 may command the FMS 132 to implement the shortest path or micro-shortcut for the segment of interest 200.

As may be appreciated, this feature may be implemented multiple times during the aircraft flight along the flight plan, by returning to step 306. For example, referring back to FIG. 2, prior to reaching the ending waypoint 204, the processing system 102 can identify a second geographical environment associated with a second segment of interest; determine a second relevant air traffic control (ATC) for the second geographical environment; request, from the second relevant ATC, a second amount of deviation from the initial flight plan for the second segment of interest; obtain, from the second relevant ATC, permission for the second amount of deviation from the initial flight plan for the second segment of interest; use at least the second amount of deviation to calculate a second shortest path for the second segment of interest; and modify the initial flight plan for the second segment of interest such that the aircraft flies the second shortest path for the second segment of interest.

Likewise, when the segment of interest is defined by a starting location and an ending location, the processing system 102 may, prior to reaching the ending location, identify a second geographical environment associated with a second segment of interest; determine a second relevant air traffic control (ATC) for the second geographical environment; request, from the second relevant ATC, a second amount of deviation from the initial flight plan for the second segment of interest; obtain, from the second relevant ATC, permission for the second amount of deviation from the initial flight plan for the second segment of interest; use at least the second amount of deviation to calculate a second shortest path for the second segment of interest; and modify the initial flight plan for the second segment of interest such that the aircraft flies the second shortest path for the second segment of interest.

Further, when the segment of interest is defined by a current location and an amount of time, the processing system 102 may, prior to an expiration of the amount of time, identify, by the processing system, a second geographical environment associated with a second segment of interest; determine, by the processing system, a second relevant air traffic control (ATC) for the second geographical environment; request, from the second relevant ATC, a second amount of deviation from the initial flight plan for the second segment of interest; obtain, from the second relevant ATC, permission for the second amount of deviation from the initial flight plan for the second segment of interest; use at least the second amount of deviation to calculate a second shortest path for the second segment of interest; and modify the initial flight plan for the second segment of interest such that the aircraft flies the second shortest path for the second segment of interest.

In some embodiments, each of the steps in 310, 312, and 314 may individually or in combination be based on human input, received via the user interface 108. In various embodiments, each of the steps in 310, 312, and 314 may individually or in combination be based on the processing system 102: (i) prompting the pilot for input via user interface 108, (ii) receiving pilot input via user interface 108, responsive to the prompt, and (iii) processing the pilot input. For example, the processing system 102 may prompt the pilot to enter a relevant air traffic control (ATC) for the geographical environment at 310; For example, the processing system 102 may prompt the pilot to enter the amount of deviation from the initial flight plan and/or to verbally request, from the relevant ATC, the amount of deviation from the initial flight plan for the segment of interest at 312; For example, the processing system 102 may prompt the pilot to affirm (verbally or alphanumerically) that permission was obtained from the relevant ATC for the amount of deviation from the initial flight plan for the segment of interest at 314.

In various scenarios, a pilot flying an aircraft equipped with the aircraft system 100 is flying on micro-shortcuts provided by the flight plan modification algorithm described herein and wishes to cease flying on the micro-shortcuts. The pilot may stop using the micro-shortcuts at any time by switching it off, via the user interface 108. Upon receiving input via user interface 108 to exit, the aircraft system 100 employs the FMS 132 to compute a flight path back to the initial flight path and flies the aircraft to merge back onto the initial flight path. In an embodiment, the flight path back may be computed using a most fuel efficient route.

Flying the shortest path for the segment of interest 200 results in an objective technical benefit of a faster and more fuel-efficient flight along the initial flight plan 206. Flying a modified initial flight plan as provided by the system 100 may also deliver a subjectively smoother ride experience for passengers in the aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As mentioned, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for flight plan modification in an aircraft, comprising:
   determining, by a processing system comprising a processor and a memory device, that the aircraft is operating on a flight plan;
   identifying a segment of interest within the flight plan;
   determining a geographical environment associated with the segment of interest;
   determining, by the processing system, a relevant air traffic control (ATC) for the geographical environment;
   requesting, from the relevant ATC, an amount of deviation from the flight plan for the segment of interest;
   obtaining, from the relevant ATC, permission for the amount of deviation from the flight plan for the segment of interest;

using at least the amount of deviation to calculate a shortest path for the segment of interest upon obtaining the permission for the amount of deviation from the flight plan for the segment of interest from the relevant ATC, wherein the shortest path is an air distance; and modifying the flight plan for the segment of interest such that the aircraft flies the shortest path for the segment of interest.

2. The method of claim 1, wherein determining a geographical environment associated with the segment of interest and requesting the amount of deviation is based on human input received responsive to a prompt.

3. The method of claim 1, wherein determining a geographical environment associated with the segment of interest is based on referencing a predefined map.

4. The method of claim 1, wherein determining a geographical environment associated with the segment of interest is based on input received from a flight assistance tool.

5. The method of claim 1, wherein the segment of interest is defined by a starting location and an ending location that is a distance from the starting location.

6. The method of claim 5, further comprising, prior to reaching the ending location,
identifying, by the processing system, a second geographical environment associated with a second segment of interest;
determining, by the processing system, a second relevant air traffic control (ATC) for the second geographical environment;
requesting, from the second relevant ATC, a second amount of deviation from the flight plan for the second segment of interest;
obtaining, from the second relevant ATC, permission for the second amount of deviation from the flight plan for the second segment of interest;
using at least the second amount of deviation to calculate a second shortest path for the second segment of interest; and
modifying the flight plan for the second segment of interest such that the aircraft flies the second shortest path for the second segment of interest.

7. The method of claim 1, wherein the segment of interest is defined by a starting waypoint and an ending waypoint.

8. The method of claim 7, further comprising, prior to reaching the ending waypoint,
identifying, by the processing system, a second geographical environment associated with a second segment of interest;
determining, by the processing system, a second relevant air traffic control (ATC) for the second geographical environment;
requesting, from the second relevant ATC, a second amount of deviation from the flight plan for the second segment of interest;
obtaining, from the second relevant ATC, permission for the second amount of deviation from the flight plan for the second segment of interest;
using at least the second amount of deviation to calculate a second shortest path for the second segment of interest; and
modifying the initial flight plan for the second segment of interest such that the aircraft flies the second shortest path for the second segment of interest.

9. The method of claim 1, wherein the segment of interest is defined by a current position and an amount of time.

10. The method of claim 9, further comprising, prior to an expiration of the amount of time,
identifying, by the processing system, a second geographical environment associated with a second segment of interest;
determining, by the processing system, a second relevant air traffic control (ATC) for the second geographical environment;
requesting, from the second relevant ATC, a second amount of deviation from the flight plan for the second segment of interest;
obtaining, from the second relevant ATC, permission for the second amount of deviation from the flight plan for the second segment of interest;
using at least the second amount of deviation to calculate a second shortest path for the second segment of interest; and
modifying the flight plan for the second segment of interest such that the aircraft flies the second shortest path for the second segment of interest.

11. A system for flight plan modification on-board an aircraft, comprising:
a navigation system; and
a processing system coupled to the navigation system and programmed to:
determine that the aircraft is operating on an initial flight plan;
identify a segment of interest within the initial flight plan;
determine a geographical environment associated with the segment of interest;
determine a relevant air traffic control (ATC) for the geographical environment;
request, from the relevant ATC, an amount of deviation from the initial flight plan for the segment of interest;
obtain, from the relevant ATC, permission for the amount of deviation from the initial flight plan for the segment of interest;
use at least the amount of deviation to calculate a shortest path for the segment of interest in response to obtaining the permission for the amount of deviation from the flight plan for the segment of interest from the relevant ATC, wherein the shortest path is an air distance; and
modify the initial flight plan for the segment of interest such that the aircraft flies the shortest path for the segment of interest.

12. The system of claim 11, wherein the processing system is further programmed to determine the geographical environment associated with the segment of interest and request the amount of deviation based on human input received responsive to a prompt.

13. The system of claim 11, wherein the processing system is further programmed to determine the geographical environment associated with the segment of interest is based on referencing a predefined map.

14. The system of claim 11, wherein the processing system is further programmed to determine the geographical environment associated with the segment of interest is based on input received from a flight assistance tool.

15. The system of claim 11, wherein the processing system is further programmed to determine the segment of interest using a starting location and an ending location that is a distance from the starting location.

16. The system of claim 15, wherein the processing system is further programmed to, prior to reaching the ending location:
identify a second geographical environment associated with a second segment of interest;

determine a second relevant air traffic control (ATC) for the second geographical environment;

request, from the second relevant ATC, a second amount of deviation from the initial flight plan for the second segment of interest;

obtain, from the second relevant ATC, permission for the second amount of deviation from the initial flight plan for the second segment of interest;

use at least the second amount of deviation to calculate a second shortest path for the second segment of interest; and modify the initial flight plan for the second segment of interest such that the aircraft flies the second shortest path for the second segment of interest.

17. The system of claim 11, wherein the processing system is further programmed to determine the segment of interest using a starting waypoint and an ending waypoint.

18. The system of claim 11, wherein the processing system is further programmed to determine the segment of interest using a current position and an amount of time.

19. An aircraft system on-board an aircraft, comprising:
a navigation system;
a flight management system (FMS); and
a processing system coupled to the navigation system and FMS, the processing system configured to:
   determine that the aircraft is operating on an initial flight plan;
   identify a segment of interest within the initial flight plan;
   determine a geographical environment associated with the segment of interest;
   determine a relevant air traffic control (ATC) for the geographical environment;
   request, from the relevant ATC, an amount of deviation from the initial flight plan for the segment of interest;
   obtain, from the relevant ATC, permission for the amount of deviation from the initial flight plan for the segment of interest;
   use at least the amount of deviation to calculate a shortest path for the segment of interest in response to obtaining the permission for the amount of deviation from the flight plan for the segment of interest from the relevant ATC; and
   modify the initial flight plan for the segment of interest; and
   command the FMS to fly the shortest path for the segment of interest.

20. The aircraft system of claim 19, wherein the processing system is further configured to:
   identify a second geographical environment associated with a second segment of interest;
   determine a second relevant air traffic control (ATC) for the second geographical environment;
   request, from the second relevant ATC, a second amount of deviation from the initial flight plan for the second segment of interest;
   obtain, from the second relevant ATC, permission for the second amount of deviation from the initial flight plan for the second segment of interest;
   use at least the second amount of deviation to calculate a second shortest path for the second segment of interest; and
   modify the initial flight plan for the second segment of interest such that the aircraft flies the second shortest path for the second segment of interest.

* * * * *